United States Patent
Inoue et al.

(10) Patent No.: US 11,977,426 B2
(45) Date of Patent: May 7, 2024

(54) CONTROL APPARATUS, CONTROL METHOD AND PROGRAM

(71) Applicant: Nippon Telegraph and Telephone Corporation, Tokyo (JP)

(72) Inventors: Hiroshi Inoue, Musashino (JP); Hidetoshi Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 96 days.

(21) Appl. No.: 17/771,574

(22) PCT Filed: Oct. 30, 2019

(86) PCT No.: PCT/JP2019/042641
§ 371 (c)(1),
(2) Date: Apr. 25, 2022

(87) PCT Pub. No.: WO2021/084659
PCT Pub. Date: May 6, 2021

(65) Prior Publication Data
US 2022/0382351 A1    Dec. 1, 2022

(51) Int. Cl.
*G06F 1/28* (2006.01)
*H02J 7/00* (2006.01)

(52) U.S. Cl.
CPC ............ *G06F 1/28* (2013.01); *H02J 7/00032* (2020.01); *H02J 7/00712* (2020.01); *H02J 2300/20* (2020.01)

(58) Field of Classification Search
CPC ...... G06F 1/28; H02J 7/00032; H02J 7/00712
USPC ........................................................ 713/340
See application file for complete search history.

(56) References Cited

U.S. PATENT DOCUMENTS

| | | | | |
|---|---|---|---|---|
| 5,388,033 A | * | 2/1995 | Knupp | G05B 13/024 |
| | | | | 701/99 |
| 5,532,945 A | * | 7/1996 | Robinson | G06F 1/3215 |
| | | | | 711/115 |
| 5,751,575 A | * | 5/1998 | Hirosawa | G06F 30/00 |
| | | | | 718/107 |

(Continued)

FOREIGN PATENT DOCUMENTS

JP    2012095397    5/2012

OTHER PUBLICATIONS

NGK Insulators, Ltd., "Demand Response," NGK.co.jp, available on or before Apr. 13, 2021, retrieved on Feb. 14, 2022, retrieved from URL <https://www.ngk.co.jp/product/nas-app06.html>, 7 pages (with English Translation).

*Primary Examiner* — Paul R. Myers
(74) *Attorney, Agent, or Firm* — Fish & Richardson P.C.

(57) ABSTRACT

A control device includes a determination means that determines, when a request is received in which a power amount that is requested to be supplied, and an energy source or a type of the energy source of the power amount are specified, whether or not a supply of electric power that satisfies the energy source or the type of the energy source and the power amount that are specified in the request is possible by referring to a table that manages a stored power amount stored in a storage battery for each energy source or for each type of the energy source, and a control means that causes the power amount specified in the request to be discharged from the storage battery when it is determined by the determination means that the supply of electric power is possible.

15 Claims, 6 Drawing Sheets

(56) References Cited

U.S. PATENT DOCUMENTS

| | | | | |
|---|---|---|---|---|
| 5,752,046 A * | 5/1998 | Oprescu | G06F 1/305 | 713/340 |
| 5,964,879 A * | 10/1999 | Dunstan | G06F 1/26 | 713/340 |
| 7,024,567 B2 * | 4/2006 | Kim | G06F 1/266 | 713/340 |
| 7,058,480 B1 * | 6/2006 | Kawanishi | G06F 1/3203 | 700/286 |
| 7,240,225 B2 * | 7/2007 | Brewer | G06F 1/3203 | 713/340 |
| 7,555,666 B2 * | 6/2009 | Brundridge | G06F 1/32 | 713/340 |
| 7,669,071 B2 * | 2/2010 | Cochran | G06F 1/263 | 713/340 |
| 8,046,600 B2 * | 10/2011 | Holle | G06F 1/189 | 713/340 |
| 2002/0140964 A1 * | 10/2002 | Goto | G06K 15/00 | 358/1.14 |
| 2004/0151304 A1 * | 8/2004 | George | H04M 19/08 | 379/399.01 |
| 2006/0112285 A1 * | 5/2006 | Stineman | H04L 12/10 | 713/300 |
| 2009/0193276 A1 * | 7/2009 | Shetty | H02J 1/14 | 713/340 |
| 2009/0217060 A1 * | 8/2009 | Tsuchiya | H02J 1/10 | 713/300 |
| 2009/0271645 A1 * | 10/2009 | Mori | G06F 3/0689 | 713/320 |
| 2010/0231050 A1 * | 9/2010 | Tamaki | H02J 1/102 | 307/76 |
| 2010/0299549 A1 * | 11/2010 | Day | G06F 1/3221 | 713/340 |
| 2011/0163605 A1 * | 7/2011 | Ronen | H04L 12/10 | 307/71 |
| 2013/0134946 A1 * | 5/2013 | Nakahara | H02J 1/14 | 320/136 |
| 2013/0138256 A1 * | 5/2013 | Sako | H02J 3/381 | 700/286 |
| 2014/0025218 A1 * | 1/2014 | Nishi | H02J 3/28 | 700/295 |
| 2016/0239079 A1 * | 8/2016 | Yuasa | G06F 1/3296 | |
| 2017/0185126 A1 * | 6/2017 | Trethewey | H02J 7/00 | |

\* cited by examiner

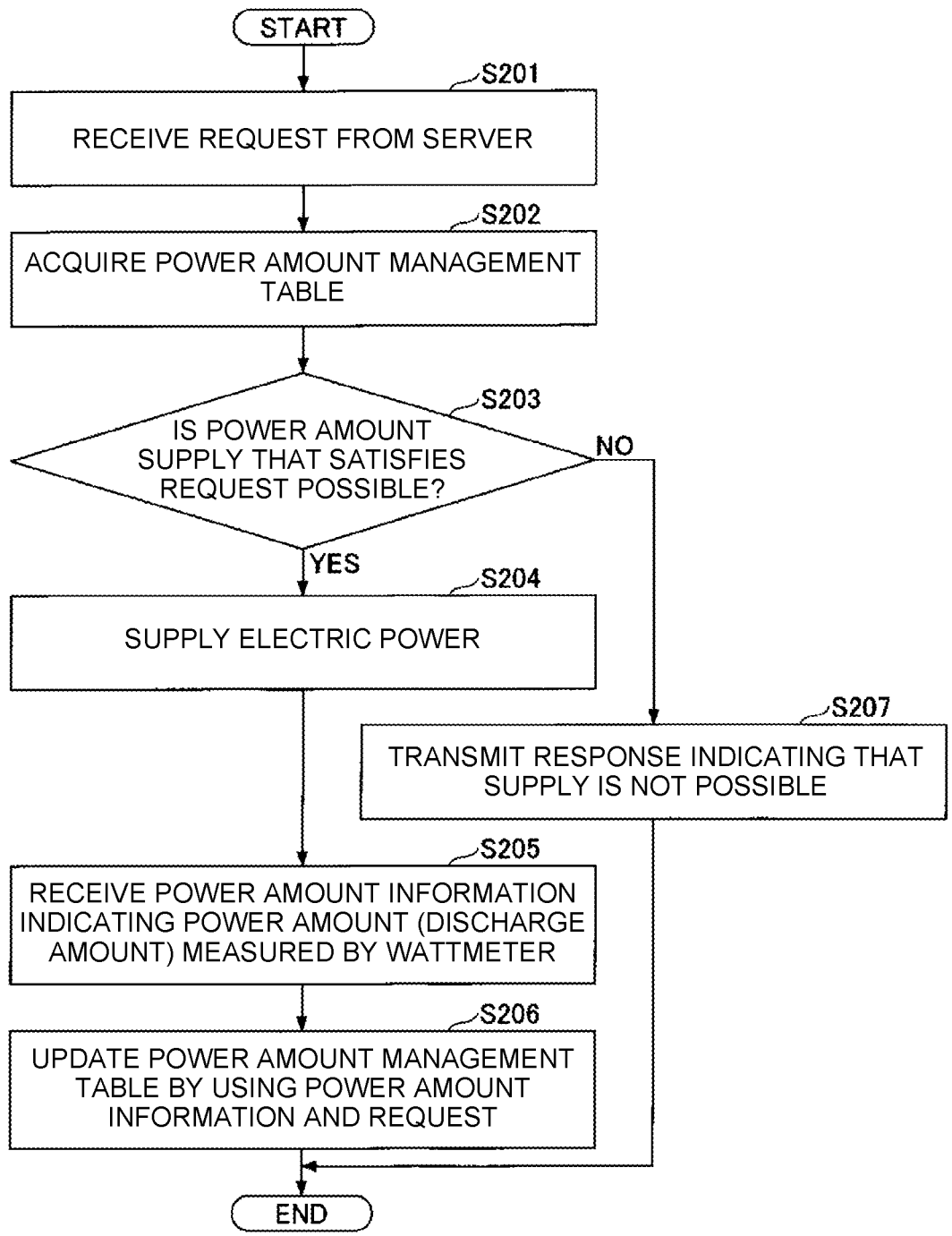

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2019/042641, having an International Filing Date of Oct. 30, 2019. The disclosure of the prior application is considered part of the disclosure of this application, and is incorporated in its entirety into this application.

TECHNICAL FIELD

The present invention relates to a control device, a control method and a program.

BACKGROUND ART

In recent years, a structure called a virtual power plant (VPP) has been known in which electric power from heterogeneous energy sources is aggregated and controlled so as to function as if it was a single electric power plant. The virtual power plant makes it possible to aggregate and control electric power from heterogeneous energy sources, for example, such as photovoltaic power generation, wind power generation, hydraulic power generation, thermal power generation, nuclear power generation, and the like, and then to store the electric power from these energy sources in a storage battery.

In addition, a structure called demand response (DR), which controls power demands of consumers (for example, a factory, an ordinary household, and the like) that have demands for electric power, is also known (for example, refer to Non-patent Literature 1).

CITATION LIST

Non-Patent Literature

Non-Patent Literature 1: "Demand Response", [online], Internet <URL: https://www.ngk.co.jp/product/nas/application/feature06/>

SUMMARY OF THE INVENTION

Technical Problem

Now, in recent years, as the result of an increased awareness toward environmental load reduction, demand has been on the rise for renewable energies such as photovoltaic power generation, wind power generation, hydraulic power generation, and the like. Therefore, it is conceivable that when a power supply is requested to a virtual power plant, for example, an energy source (for example, photovoltaic power generation, wind power generation, hydraulic power generation, or the like) of the electric power is also specified.

However, once the electric power from a plurality of energy sources is stored in a storage battery, the electric power cannot be separated into each energy source. Therefore, when a power supply from a particular energy source is requested, it is not known whether or not the electric power that satisfies this request is suppliable.

An embodiment of the present invention has been made in view of the above point, and the object thereof is to manage a suppliable power amount for each energy source.

Means for Solving the Problem

In order to achieve the above object, a control device according to the present embodiment includes a determination means that determines, when a request is received in which a power amount that is requested to be supplied, and an energy source or a type of the energy source of the power amount are specified, whether or not a supply of electric power that satisfies the energy source or the type of the energy source and the power amount that are specified in the request is possible by referring to a table that manages a stored power amount stored in a storage battery for each energy source or for each type of the energy source, and a control means that causes the power amount specified in the request to be discharged from the storage battery when it is determined by the determination means that the supply of electric power is possible.

Effects of the Invention

The suppliable power amount can be managed for each energy source.

BRIEF DESCRIPTION OF DRAWINGS

FIG. 6 is a flow chart showing an example of power supply control processing according to the present embodiment.

DESCRIPTION OF EMBODIMENTS

Hereinafter, an embodiment of the present invention will be described. In the present embodiment, a control device 10 is described that can manage a suppliable power amount for each energy source and control a supply thereof in a virtual power plant equipped with a storage battery in which electric power from a plurality of energy sources is stored.

Entire Configuration of Control Device 10

Figure 1:
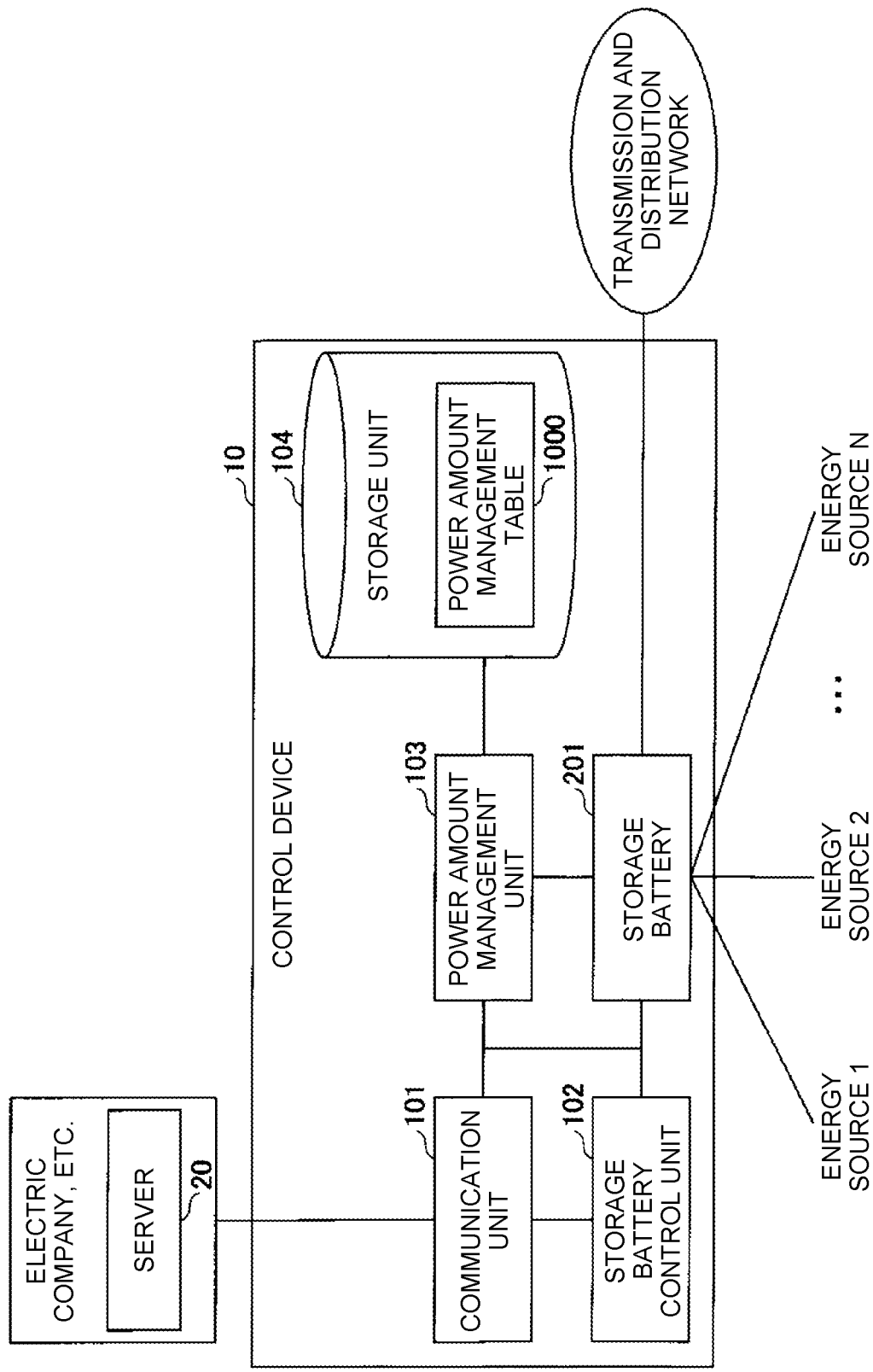
FIG. 1 is a diagram showing an example of an entire configuration of a control device according to the present embodiment.

First, an entire configuration of the control device 10 according to the present embodiment will be described with reference to FIG. 1. FIG. 1 is a diagram showing an example of the entire configuration of the control device 10 according to the present embodiment.

As shown in FIG. 1, the control device 10 according to the present embodiment is a computer or a computer system that includes a storage battery 201 connected to a plurality of energy sources and storing electric power from the plurality of energy sources. In the present embodiment, the number of energy sources is defined as N (where N is an integer 2 or greater), and the energy sources are defined as an "energy source 1", an "energy source 2", . . . , and an "energy source N". Note that there are various types of energy sources, for example, such as photovoltaic power generation, wind power generation, hydraulic power generation, thermal power generation, nuclear electric power generation, and the like.

In addition, the control device 10 according to the present embodiment supplies electric power stored in the storage battery 201 in response to a reception of a request, from a server 20, for requesting necessary electric power. In this request, for example, at least a necessary amount of electric power (requested power amount) and an energy source of the electric power (requested energy source) are specified. Specifically, for example, the requested power amount "XX kW", the requested energy source "energy source 1", and the like are specified in the request. However, this is one example, and instead of the requested energy source, a type of the requested energy source (requested energy source type) may be specified in the request. In addition, for example, a time in which the requested power amount is necessary (requested time) may be specified in the request. Note that the requested energy source type includes a "renewables" in which the required energy source is a renewable energy such as photovoltaic power generation, wind power generation, hydraulic power generation, or the like, and a "system" in which the required energy source is thermal power generation, nuclear electric power, or the like.

Note that such a request corresponds to a demand response, for example, from an electric power company, an electric power market, or the like.

Here, the control device 10 according to the present embodiment includes a communication unit 101, a storage battery control unit 102, a power amount management unit 103, and a storage unit 104.

The storage unit 104 stores a power amount management table 1000 that manages a power amount stored in the storage battery 201 for each energy source. A detailed configuration of the power amount management table 1000 will be described below.

The communication unit 101 receives a request from the server 20 through a communication network (for example, a LAN (Local Area Network), a cellular telephone network, the Internet, or the like).

When the request is received by the communication unit 101, the storage battery control unit 102 determines whether or not a power supply that satisfies a requested power amount and a requested energy source that are specified in the corresponding request is possible by referring to the power amount management table 1000 acquired by the power amount management unit 103. Then, if it is determined that the power supply is possible, the storage battery control unit 102 controls the storage battery 201 to output (discharge) the requested power amount to a transmission and distribution network.

The power amount management unit 103 acquires the power amount management table 1000 stored in the storage unit 104 and updates the power amount management table 1000 in response to a charge to the storage battery 201 and a discharge from the storage battery 201.

<<Configuration of Storage Battery 201>>

Figure 2:
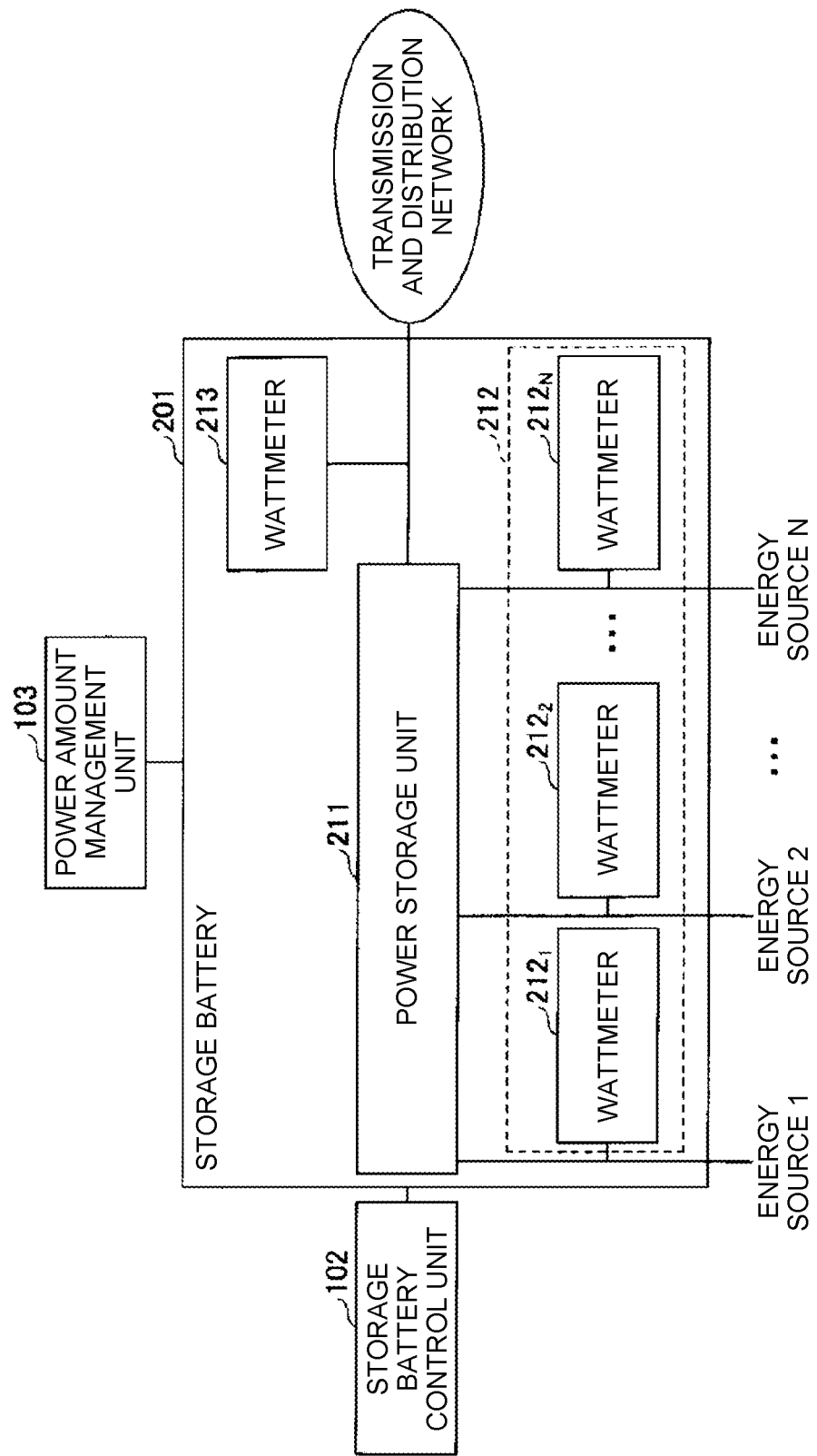
FIG. 2 is a diagram showing an example of a structure of a storage battery according to the present embodiment.

Here, a configuration of the storage battery 201 according to the present embodiment will be described with reference to FIG. 2. FIG. 2 is a diagram showing an example of the configuration of the storage battery 201 according to the present embodiment.

As shown in FIG. 2, the storage battery 201 according to the present embodiment includes a power storage unit 211, a plurality of wattmeters 212, and a wattmeter 213.

The power storage unit 211 stores electric power input from each of the energy source 1 to the energy source N. In addition, the power storage unit 211 discharges electric power to the transmission and distribution network according to a control by the storage battery control unit 102.

The wattmeter 212 measures a power amount of the electric power that is input from an energy source corresponding to the corresponding wattmeter 212 (in other words, a charge amount), and transmits, to the power amount management unit 103, power amount information that indicates the measured power amount. In an example shown in FIG. 2, it is assumed that n=1, 2, . . . , N and the wattmeter 212 that measures the power amount of the electric power input from the energy source n is expressed as a "wattmeter 212$_n$".

The wattmeter 213 measures a power amount of the electric power that is output to the transmission and distribution network (in other words, a discharged amount), and transmits, to the power amount management unit 103, power amount information that indicates the measured power amount.

Note that by receiving the power amount information from the wattmeters 212 and the wattmeter 213, the power amount management unit 103 can use this power amount information to update the power amount management table 1000.

<<Configuration of Power Amount Management Table 1000>>

Figure 3:
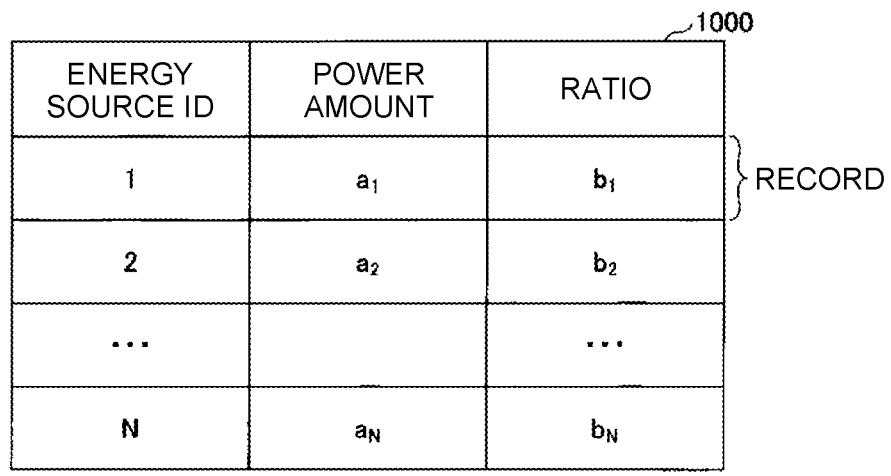
FIG. 3 is a diagram showing an example of a power amount control table.

Next, the power amount management table 1000 stored in the storage unit 104 will be described with reference to FIG. 3. FIG. 3 is a diagram showing an example of the power amount management table 1000.

As shown in FIG. 3, N pieces of records are stored in the power amount management table 1000, and each record includes an energy source ID, a power amount, and a ratio.

The energy source ID is identification information to identify the energy source. The power amount is a power amount stored by the electric power from the energy source of the corresponding energy source ID from among all power amounts stored in the storage battery 201 (more exactly, the power storage unit 211). The ratio is a ratio (percentage) of the power amount stored by the electric power from the energy source of the corresponding energy source ID from among all power amounts stored in the storage battery 201 (more exactly, the power storage unit 211).

For example, a first record of the example shown in FIG. 3 includes an energy source ID "1", a power amount "$a_1$", and a ratio "$b_1$". This shows that the power amount stored by the electric power from the energy source of the energy source ID "1" is $a_1$, and the ratio thereof is $b_1$.

Similarly, for example, a second record includes an energy source ID "2", a power amount "$a_2$", and a ratio "$b_2$". This shows the power amount stored by the electric power from the energy source of the energy source ID "1" is $a_1$, and the ratio thereof is $b_2$.

Therefore, in the example shown in FIG. 3, the total power amount stored in the storage battery 201 is represented by $a_1+a_2+ \ldots +a_N$. In addition, $b_1+b_2+ \ldots +b_N=100$. Wherein, each $a_n$ (n=1, . . . , N) is a real number 0 or greater, each $b_n$ (n=1, . . . , N) is a real number 0 or greater and 100 or smaller. Hereinafter, for the sake of brevity, the energy source ID of the energy source n (n=1, . . . , N) is defined as "n".

In this manner, in the power amount management table 1000, the power amount stored by the electric power from the corresponding energy source and the ratio thereof are managed for each energy source.

Note that, for example, each record may include the type of the energy source (energy source type) of the corresponding energy source ID. Specifically, for example, the energy source type "renewables" may be included in the corresponding record when the energy source of the corresponding energy source ID is photovoltaic power generation, wind power generation, hydraulic power generation, or the like, and the energy source type "system" may be included in the corresponding record when the energy source of the corresponding energy source ID is thermal power generation, nuclear electric power generation, or the like.

In addition, in the example shown in FIG. 3, the N pieces of records each corresponding to the energy source 1 to the energy source N are stored in the power amount management table 1000, but a record indicating the total power amount stored in the storage battery 201 may further be stored, and a record indicating a power amount in which the power amounts stored in the storage battery 201 are added up for each energy source type may be stored.

Hardware Configuration of Control Device 10

Figure 4:
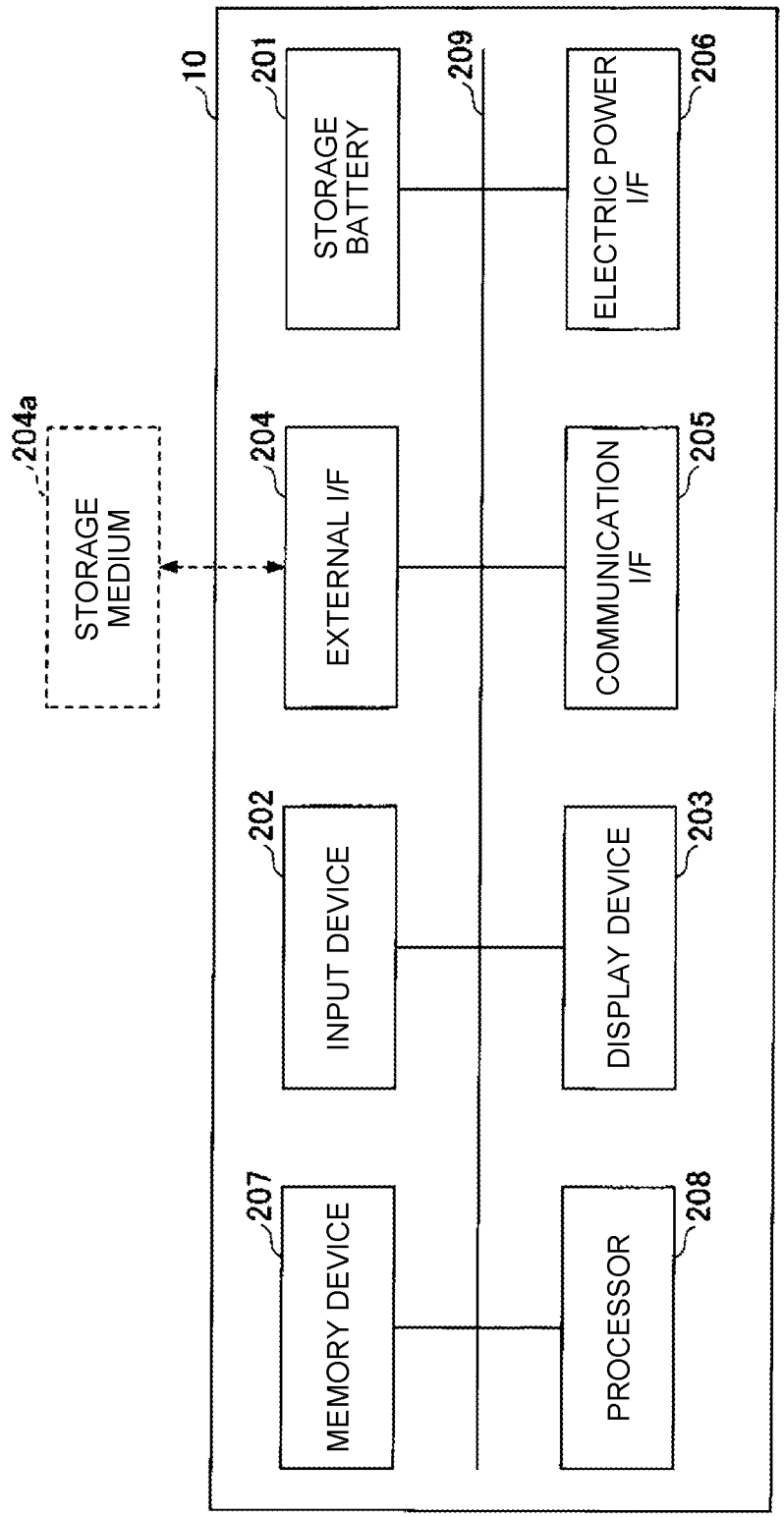
FIG. 4 is a diagram showing an example of a hardware configuration of the control device according to the present embodiment.

Next, a hardware configuration of the control device 10 according to the present embodiment will be described with reference to FIG. 4. FIG. 4 is a diagram showing an example of the hardware configuration of the control device 10 according to the present embodiment.

As shown in FIG. 4, the control device 10 according to the present embodiment includes a storage battery 201, an input device 202, a display device 203, an external I/F 204, a communication I/F 205, an electric power I/F 206, a memory device 207, and a processor 208. Each piece of the hardware is connected to be able to communicate each other through a bus 209.

The storage battery 201 is a battery that can store electric power. Note that, as described above, the storage battery 201 includes the power storage unit 211 that stores electric power, the wattmeters 212 that measure the power amounts of the electric power input from the respective energy sources, respectively, the wattmeter 213 that measures the power amount of the electric power output to the transmission and distribution network.

The input device 202 is, for example, a keyboard, a mouse, a touch panel, a control button of various types, or the like. The display device 203 is, for example, a display or the like. Note that the control device 10 may not have at least one of the input device 202 and the display device 203.

The external I/F 204 is an interface with an external device such as a storage medium 204a. The storage medium 204a includes, for example, a CD, a DVD, an SD memory card, a USB memory, and the like.

The communication I/F 205 is an interface for connecting the control device 10 to the communication network. The electric power I/F 206 is an interface for connecting the control device 10 to the transmission and distribution network.

The memory device 207 is a storage device of various types, for example, such as a RAM (Random Access Memory), a ROM (Read Only Memory), a flash memory, an HDD (Hard Disk Drive), an SSD (Solid State Drive), or the like. The storage unit 104 can be implemented, for example, by using the memory device 207. However, the storage unit 104 may be implemented, for example, by a storage device, a database server, or the like that is connected to the control device 10 through the communication network.

The processor 208 is an arithmetic operation device of various types, for example, such as a CPU (Central Processing Unit). Each function unit that the control device 10 has (for example, the communication unit 101, the storage battery control unit 102, the power amount management unit 103, or the like) is implemented, for example, by processing which one or more program stored in the memory device 207 causes the processor 208 to execute.

The control device 10 according to the present embodiment can implement power charge processing and power supply control processing, which will be described later, by the hardware configuration shown in FIG. 4. Note that the hardware configuration shown in FIG. 4 is one example, and the control device 10 may have other hardware configurations. For example, the control device 10 according to the present embodiment may have a plurality of memory devices 207, or may have a plurality of processors 208.

Power Charge Processing

Figure 5:
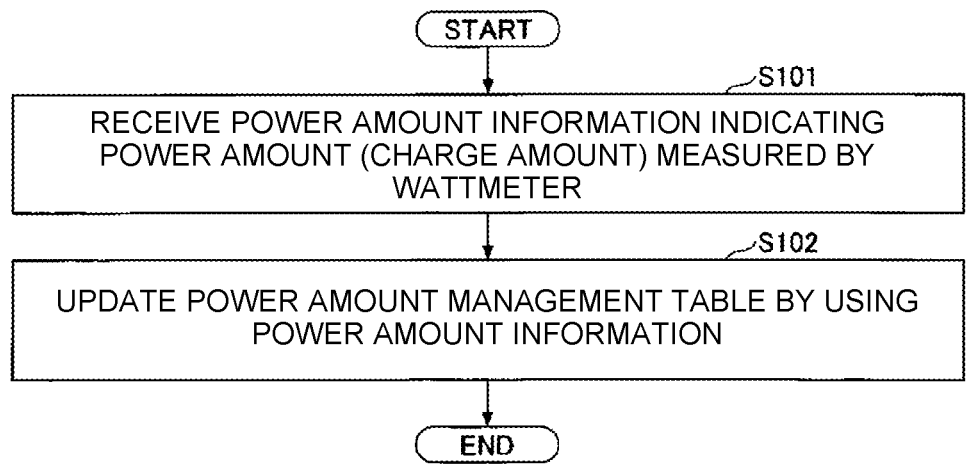
FIG. 5 is a flow chart showing an example of power charge processing according to the present embodiment.

Next, the power charge processing in which the electric power input from each energy source is stored in the storage battery 201 will be described with reference to FIG. 5. FIG. 5 is a flow chart showing an example of the power charge processing according to the present embodiment. Hereinafter, it is assumed that the electric power is input to the storage battery 201 from at least one energy sources of the energy sources 1 to N.

First, the power amount management unit 103 receives the power amount information from the wattmeter 212 (step S101). This power amount information includes the power amount measured by the wattmeter 212 (in other words, the charge amount) and identification information (a wattmeter ID) that identifies the corresponding wattmeter 212.

Next, the power amount management unit 103 updates the power amount management table 1000 stored in the storage unit 104 by using the power amount information received in the above step S101 (step S102). The power amount management unit 103 can update the power amount management table 1000, for example, by Step 11 to Step 12 described below.

Step 11: First, after identifying the energy source ID of the energy source in which the electric power is to be measured by the wattmeter 213 of the wattmeter ID included in the power amount information, the power amount management unit 103 adds a power amount included in the corresponding power amount information to a power amount of a record that includes the identified energy source ID. Thereby, the power amount of the corresponding record is updated. Note that the power amount management unit 103 only needs to identify the energy source ID of the energy source in which the electric power is to be measured by the wattmeter 213 of the wattmeter ID included in the power amount information by referring to, for example, a table or the like in which the wattmeter ID and the energy source ID are associated with each other.

Here, if the power amount management unit 103 receives a plurality of power amount information, the above Step 11 is repeated for each power amount information. Thereby, the power amounts of a plurality of records are updated.

Step 12: Next, the power amount management unit 103 recalculates the ratio of each record by using the power amounts of all records after the power amounts are updated in the above Step 11. Thereby, the ratios of all records are updated.

As described above, the control device 10 according to the present embodiment updates the power amount management table 1000 every time the storage battery 201 is charged by the electric power from each energy source (in other words, every time the power amount management unit 103 receives the power amount information from the wattmeter 212). This makes it possible for the control device 10 according to the present embodiment to manage the suppliable power amount for each energy source of the power amount stored in the storage battery 201.

Power Supply Control Processing

Next, the power supply control processing in which a supply of electric power is controlled in response to a request from the server 20 will be described with reference to FIG. 6. FIG. 6 is a flow chart showing an example of the power supply control processing according to the present embodiment.

First, the communication unit 101 receives the request from the server 20 through the communication network (step S201). Here, the request includes at least the requested power amount and the requested energy source. Note that as described above, the request may include the requested energy source type (for example, either the "renewables" or the "system", or the like) instead of the requested energy source.

Next, the power amount management unit 103 acquires the power amount management table 1000 stored in the storage unit 104 (in other words, reads out the power amount management table 1000) (step S202).

Next, the storage battery control unit 102 determines whether or not a power supply that satisfies the requested power amount and the requested energy source that are included in the request acquired in the above step S201 is possible by referring to the power amount management table 1000 acquired in the above step S202 (step S203). The power amount management unit 103 can determine whether or not the power supply is possible, for example, by Step 21 to Step 22 described below.

Step 21: First, the storage battery control unit 102 identifies a record that includes an energy source ID corresponding to the requested energy source from among records stored in the power amount management table 1000.

Step 22: Next, the storage battery control unit 102 verifies whether or not the power amount included in the record identified in the above Step 21 is equal to or more than the required power amount. Then, the storage battery control unit 102 determines that the power supply is possible if the power amount is equal to or more than the required power amount, and determines the power supply is not possible if that is not the case.

Note that if the requested energy source type is included in the request instead of the requested energy source, it is possible to determine whether or not the power supply is possible by Step 21' to Step 22' described below. However, in this case, it is assumed that each record stored in the power amount management table 1000 includes the energy source type.

Step 21': First, the storage battery control unit 102 identifies a record that includes an energy source type corresponding to the requested energy source type from among records stored in the power amount management table 1000. Note that in this case, one or more records are identified.

Step 22': Next, the storage battery control unit 102 verifies whether or not a total of the power amounts that are each included in each record identified in the above Step 21' is equal to or more than the requested power amount. Then, the storage battery control unit 102 determines that the power supply is possible if the total of the corresponding electric power is equal to or more than the requested power amount, and determines the power supply is not possible if that is not the case.

If it is determined that the power supply is possible in the above step S203, the storage battery control unit 102 controls the storage battery 201 to output (discharge) the requested power amount to the power transmission and distribution network (step S204). Thereby, the power amount required by the server 20 is supplied. Note that the storage battery control unit 102 can cause the storage battery 201 to discharge the required power amount by transmitting, to the storage battery 201, a discharge instruction in which the requested power amount is specified.

Next, the power amount management unit 103 receives the power amount information from the wattmeter 213 (step S205). This power amount information includes the power amount measured by the wattmeter 213 (in other words, the discharge amount discharged in the above step S204) and identification information (the wattmeter ID) that identifies the corresponding wattmeter 213.

Next, the power amount management unit 103 updates the power amount management table 1000 stored in the storage unit 104 by using the power amount information received in the above step S205 and the request received in the above step S201 (step S206). The power amount management unit 103 can update the power amount management table 1000, for example, by Step 31 to Step 33 described below.

Step 31: First, the power amount management unit 103 identifies a record that includes an energy source ID corresponding to the requested energy source included in the corresponding request from among records stored in the power amount management table 1000. Note that this record is the same as the record identified in Step 21.

Step 32: Next, the power amount management unit 103 subtracts the power amount included in the power amount information (in other words, the discharged amount discharged in the above step S204) from a power amount included in the record identified in the above Step 31.

Step 33: Then, the power amount management unit 103 recalculates the ratio of each record by using the power amounts of all records after the power amounts are updated in the above Step 32. Thereby, the ratios of all records are updated.

Note that if the requested energy source type is included in the request instead of the required energy source, the power amount management table 1000 can be updated by Step 31' to Step 33' described below. However, in this case, it is assumed that each record stored in the power amount management table 1000 includes the energy source type.

Step 31': First, the power amount management unit 103 identifies a record that includes an energy source type corresponding to the requested energy source type included in the request from among records stored in the power amount management table 1000. Note that this record is the same as the record identified in the above Step 21'.

Step 32': Next, the power amount management unit 103 updates the power amounts respectively included in the respective records so that the total of the power amounts respectively included in the respective records identified in the above Step 31 is a value in which the power amount included in the power amount information is subtracted.

For example, when it is assumed that the number of records identified in the above Step 31' is 3, the power amounts respectively included in the respective records are $a_1$, $a_2$, $a_3$, and the power amount included in the power amount information is c, the total of the power amounts before update is $a_1+a_2+a_3$. Then, the power amount management unit 103 updates the power amounts $a_1, a_2, a_3$ that are respectively included in the respective records identified in the above Step 31' so that the total of the power amounts after update is $a_1+a_2+a_3-c$. Specifically, when $0 \le c_1 \le a_1$, $0 \le c_2 \le a_2$, $0 \le c_3 \le a_3$, and $c_1+c_2+c_3=c$, the power amount management unit 103 only needs to updates $a_1$ to $a_1-c_1$, $a_2$ to $a_2-c_2$, and $a_3$ to $a_3-c_3$. Note that as one example, it is conceivable to define $c_1=c_2=c_3=c/3$.

Step 33': Then, the power amount management unit 103 recalculates the ratio of each record by using the power amounts of all records after the power amounts are updated in the above Step 32'. Thereby, the ratios of all records re updated.

On the other hand, when it is not determined that the power supply is possible in the above step S203, the communication unit 101 transmits, to the server 20, a response indicating that the power supply is not possible (step S207). However, the process is not limited to this. For example, the storage battery control unit 102 may control the storage battery 201 to output (discharge), to the transmission and distribution network, a power amount to an extent that can be supplied with respect to the requested energy source (or the requested energy source type), and the communication unit 101 may transmit a response to the server 20 to the effect that the power amount to the extent that can be supplied is to be supplied although that power amount does not satisfy the required power amount.

As described above, the control device 10 according to the present embodiment can determine whether or not the power supply that satisfies the requested power amount and the requested energy source (or the requested energy source type) that are included in the request from the server 20 is possible, and perform a power supply according to the determination result. Therefore, even when a consumer requests only a supply of electric power derived from a particular energy source or only a supply of electric power derived from the energy source of a particular energy source type, the control device 10 according to the present embodiment can determine whether or not a power supply that satisfies these requests is possible, and then perform a power supply according to the determination result.

Note that in the present embodiment, a power loss due to power storage and power transmission is not considered, but the power amount to be charged or discharged may be calculated with a value in consideration of the power loss at the time of power storage or power transmission.

The present invention is not limited to the embodiment specifically disclosed above, and various modifications, alterations, and the like can be made without departing from the descriptions of the claims.

REFERENCE SIGNS LIST

10 Control device
20 Server
101 Communication unit
102 Storage battery control unit
103 Power amount management unit
104 Storage unit
201 Storage battery
212 Wattmeter
213 Wattmeter
1000 Power amount control table

The invention claimed is:

1. A control device, comprising:
a storage battery control unit, including one or more processors, configured to determine, when a request is received in which a power amount that is requested to be supplied, and an energy source or a type of the energy source of the power amount are specified, whether or not a supply of electric power that satisfies the energy source or the type of the energy source and the power amount that are specified in the request is possible by referring to a table that manages a stored power amount stored in a storage battery for each energy source or for each type of the energy source;
cause the power amount specified in the request to be discharged from the storage battery when it is determined by the determination means that the supply of electric power is possible; and
cause the power amount to be discharged from the storage battery to an extent that can be supplied with respect to the energy source or the type of the energy source that are specified in the request when it is not determined by the determination means that the supply of electric power is possible.

2. The control device according to claim 1, comprising a power amount management unit, including one or more processors, configured to update the stored power amount managed by the table by using first power amount information received from a first wattmeter that measures, for each energy source, a power amount charged in the storage battery.

3. The control device according to claim 2, wherein the power amount management unit is configured to update the stored power amount managed by the table by using second power amount information received from a second wattmeter that measures a power amount discharged from the storage battery.

4. The control device according to claim 1, wherein storage battery control unit is configured to:
determine, when the energy source is specified in the request, that the supply of electric power is possible if a stored power amount of the energy source specified in the request is equal to or more than the power amount specified in the request by referring to the table: and
determine, when the type of the energy source is specified in the request, that the supply of electric power is possible if a total of stored power amounts of the type of the energy source specified in the request is equal to or more than the power amount specified in the request by referring to the table.

5. The control device according to claim 1, wherein the type of the energy source includes a renewable energy and a system.

6. A control method, comprising:
determining, when a request is received in which a power amount that is requested to be supplied, and an energy source or a type of the energy source of the power amount are specified, whether or not a supply of electric power that satisfies the energy source or the type of the energy source and the power amount that are specified in the request is possible by referring to a table that manages a stored power amount stored in a storage battery for each energy source or for each type of the energy source;
causing the power amount specified in the request to be discharged from the storage battery when it is determined by the determination means that the supply of electric power is possible; and causing the power amount to be discharged from the storage battery to an extent that can be supplied with respect to the energy source or the type of the energy source that are specified in the request when it is not determined by the determination means that the supply of electric power is possible.

7. A non-transitory computer readable medium storing a program for causing a computer to function as a control device to perform:

determining, when a request is received in which a power amount that is requested to be supplied, and an energy source or a type of the energy source of the power amount are specified, whether or not a supply of electric power that satisfies the energy source or the type of the energy source and the power amount that are specified in the request is possible by referring to a table that manages a stored power amount stored in a storage battery for each energy source or for each type of the energy source;

causing the power amount specified in the request to be discharged from the storage battery when it is determined by the determination means that the supply of electric power is possible; and causing the power amount to be discharged from the storage battery to an extent that can be supplied with respect to the energy source or the type of the energy source that are specified in the request when it is not determined by the determination means that the supply of electric power is possible.

8. The non-transitory computer readable medium according to claim 7, wherein the stored program further causes the computer to perform:

updating the stored power amount managed by the table by using first power amount information received from a first wattmeter that measures, for each energy source, a power amount charged in the storage battery.

9. The non-transitory computer readable medium according to claim 8, wherein the stored program further causes the computer to perform:

updating the stored power amount managed by the table by using second power amount information received from a second wattmeter that measures a power amount discharged from the storage battery.

10. The non-transitory computer readable medium according to claim 7, wherein the stored program further causes the computer to perform:

determining, when the energy source is specified in the request, that the supply of electric power is possible if a stored power amount of the energy source specified in the request is equal to or more than the power amount specified in the request by referring to the table: and determining, when the type of the energy source is specified in the request, that the supply of electric power is possible if a total of stored power amounts of the type of the energy source specified in the request is equal to or more than the power amount specified in the request by referring to the table.

11. The non-transitory computer readable medium according to claim 7, wherein the type of the energy source includes a renewable energy and a system.

12. The control method according to claim 6, further comprising:

updating the stored power amount managed by the table by using first power amount information received from a first wattmeter that measures, for each energy source, a power amount charged in the storage battery.

13. The control method according to claim 12, further comprising:

updating the stored power amount managed by the table by using second power amount information received from a second wattmeter that measures a power amount discharged from the storage battery.

14. The control method according to claim 6, further comprising:

determining, when the energy source is specified in the request, that the supply of electric power is possible if a stored power amount of the energy source specified in the request is equal to or more than the power amount specified in the request by referring to the table: and determining, when the type of the energy source is specified in the request, that the supply of electric power is possible if a total of stored power amounts of the type of the energy source specified in the request is equal to or more than the power amount specified in the request by referring to the table.

15. The control method according to claim 6, wherein the type of the energy source includes a renewable energy and a system.

* * * * *